United States Patent
Lee et al.

(10) Patent No.: US 11,697,183 B2
(45) Date of Patent: Jul. 11, 2023

(54) FABRICATION OF A POLISHING PAD FOR CHEMICAL MECHANICAL POLISHING

(71) Applicant: Taiwan Semiconductor Manufacturing Co., Ltd., Hsin-Chu (TW)

(72) Inventors: An-Hsuan Lee, Hsinchu (TW); Ming-Shiuan She, Taoyuan (TW); Chen-Hao Wu, Taichung (TW); Chun-Hung Liao, Taichung (TW); Shen-Nan Lee, Hsinchu County (TW); Teng-Chun Tsai, Hsinchu (TW)

(73) Assignee: TAIWAN SEMICONDUCTOR MANUFACTURING CO., LTD., Hsinchu (TW)

(*) Notice: Subject to any disclaimer, the term of this patent is extended or adjusted under 35 U.S.C. 154(b) by 1049 days.

(21) Appl. No.: 16/454,402

(22) Filed: Jun. 27, 2019

(65) Prior Publication Data

US 2020/0030934 A1 Jan. 30, 2020

Related U.S. Application Data

(60) Provisional application No. 62/703,774, filed on Jul. 26, 2018.

(51) Int. Cl.
| | | |
|---|---|---|
| C08J 9/26 | (2006.01) | |
| B24B 37/24 | (2012.01) | |
| B32B 3/10 | (2006.01) | |
| B32B 3/12 | (2006.01) | |
| C09G 1/02 | (2006.01) | |
| B24B 37/10 | (2012.01) | |
| C08L 81/06 | (2006.01) | |
| C08L 75/04 | (2006.01) | |
| C08L 77/00 | (2006.01) | |
| C08L 53/00 | (2006.01) | |
| B32B 5/00 | (2006.01) | |

(52) U.S. Cl.
CPC ............ *B24B 37/24* (2013.01); *B24B 37/107* (2013.01); *B32B 3/10* (2013.01); *B32B 3/12* (2013.01); *C08J 9/26* (2013.01); *C09G 1/02* (2013.01); *B32B 5/00* (2013.01); *C08L 53/00* (2013.01); *C08L 75/04* (2013.01); *C08L 77/00* (2013.01); *C08L 81/06* (2013.01)

(58) Field of Classification Search
CPC ..... C08J 9/26; B32B 3/10; B32B 3/12; B32B 5/00; B32B 2305/026
USPC ...... 428/304.4, 318.4, 319.3; 521/61, 62, 63
See application file for complete search history.

(56) References Cited

U.S. PATENT DOCUMENTS

| | | | |
|---|---|---|---|
| 8,981,427 B2 | 3/2015 | Hydrick et al. | |
| 9,416,297 B2 | 8/2016 | Hsu et al. | |
| 9,530,655 B2 | 12/2016 | Hsu et al. | |
| 9,994,736 B2 | 6/2018 | Hsu et al. | |
| 2006/0052040 A1* | 3/2006 | Prasad | B24D 11/001 451/41 |
| 2008/0265375 A1 | 10/2008 | Pietsch et al. | |
| 2010/0012976 A1 | 1/2010 | Hydrick et al. | |
| 2014/0170852 A1 | 6/2014 | Noller et al. | |
| 2014/0178582 A1* | 6/2014 | Gaynor | B01D 71/80 427/245 |
| 2018/0033638 A1* | 2/2018 | Ku | B81C 1/00087 |

FOREIGN PATENT DOCUMENTS

| | | |
|---|---|---|
| CN | 1505554 A | 6/2004 |
| CN | 1774316 A | 5/2006 |
| CN | 101316683 A | 12/2008 |
| CN | 107646138 A | 1/2018 |
| CN | 108115554 A | 6/2018 |
| JP | 2017035773 A | 2/2017 |
| TW | 200605984 A | 2/2006 |
| TW | 200639019 A | 11/2006 |
| TW | 200724303 A | 7/2007 |
| TW | 200906555 A | 2/2009 |
| TW | 201433413 A | 9/2014 |
| TW | 201249974 A | 12/2014 |
| TW | 201623553 A | 7/2016 |
| TW | 201641218 A | 12/2016 |
| TW | 201809094 A | 3/2018 |

OTHER PUBLICATIONS

Sanha Kim et al. "The Role of Pad Topography in Chemical-Mechanical Polishing," IEEE Transactions on Semiconductor Manufacturing vol. 27, No. 3, Aug. 2014. pp. 431-442.

Xiaoyan Liao et al., "Effect of Pad Surface Micro-Texture on Dishing and Erosion during Shallow Trench Isolation Chemical Mechanical Planarization," Japanese Journal of Applied Physics 53, 086501 (2014), 6 pages.

Julie N L Albert and Thomas H Epps III, "Self-Assembly of Block Copolymer Thin Films", Department of Chemical Engineering, University of Delaware, 10 Academy Street, Newark, Delaware 19716, Materials Today, Jun. 2010, vol. 13, No. 6, 10 pages.

Frank S Bates and Glenn H Fredrickson, "Block Copolymers—Designer Soft Materials," Physics Today, 52, 2, 32 (1999), American Institute of Physics, p. 32-38.

(Continued)

*Primary Examiner* — Michael J Feely
(74) *Attorney, Agent, or Firm* — Haynes and Boone, LLP

(57) ABSTRACT

A method of forming a CMP pad includes providing a solution of a block copolymer (BCP), where the BCP includes a first segment and a second segment connected to the first segment, the second segment being different from the first segment in composition. The method further includes processing the BCP to form a polymer network having a first phase and a second phase embedded in the first phase, where the first phase includes the first segment and the second phase includes the second segment, and subsequently removing the second phase from the polymer network, thereby forming a polymer film that includes a network of pores embedded in the first phase. Thereafter, the method proceeds to combining the CMP top pad and a CMP sub-pad to form a CMP pad, where the CMP top pad is configured to engage with a workpiece during a CMP process.

20 Claims, 12 Drawing Sheets

(56) References Cited

OTHER PUBLICATIONS

Ming-Shiuan She et al., "Nanostructured Thin Films of Degradable Block Copolymers and Their Applications," Department of Chemical Engineering, National Tsing Hua University, Hsinchu, Taiwan, ROC, NPG Asia Materials, Mar. 15, 2013, Nature Japan K.K., 9 pages.

Cheolmin Park et al., "Enabling Nanotechnology With Self Assembled Block Copolymer Patterns," Polymer 44 (2003), pp. 6725-6760.

* cited by examiner

FABRICATION OF A POLISHING PAD FOR CHEMICAL MECHANICAL POLISHING

CROSS-REFERENCE TO RELATED APPLICATIONS

This is a non-provisional application of and claims priority to U.S. Provisional Patent Application Ser. No. 62/703,774, filed on Jul. 26, 2018, the entire disclosure of which is incorporated herein by reference.

BACKGROUND

The integrated circuit (IC) industry has experienced exponential growth. Technological advances in IC materials and design have produced generations of ICs, where each generation has smaller and more complex circuits than the previous generation. In the course of IC evolution, functional density (i.e., the number of interconnected devices per chip area) has generally increased while geometry size (i.e., the smallest component (or line) that may be created using a fabrication process) has decreased. This scaling down process generally provides benefits by increasing production efficiency and lowering associated costs.

A particular challenge, and one which has become increasingly difficult for reduced device geometries, relates to the substrate planarization requirements during device fabrication. To meet such requirements, chemical mechanical polishing/planarizing (CMP) is a process that has been introduced and used throughout the semiconductor industry, and which continues to be developed. In general, a CMP process may be optimized for specific process conditions such as, for example, the material being polished, device structure, and/or desired etch rate. With the continued advancement of highly-scaled IC technology, bringing with it new materials and new device structures, optimization of CMP processes has not been entirely satisfactory in all respects.

During a CMP process, a surface of a substrate is acted upon by a slurry and a polishing pad. For example, a force may be applied to press the substrate against the pad while the substrate and the pad are rotated. The rotation and the substrate-to-pad force, in conjunction with the slurry supplied to the substrate, serve to remove substrate material and thus planarize the surface of the substrate. While methods of performing a CMP have generally been adequate, they have not been satisfactory in all aspects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
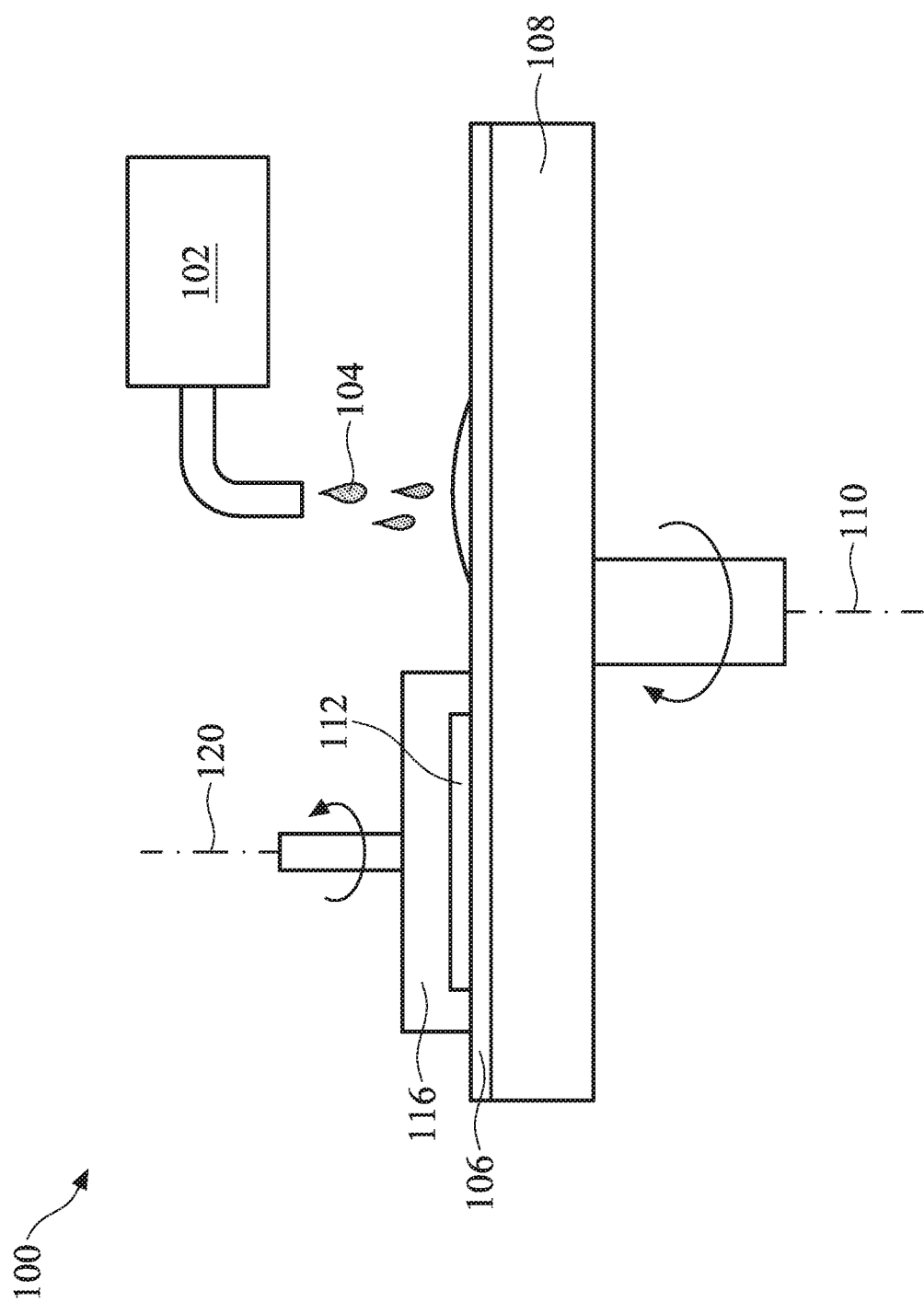
FIG. 1 illustrates a chemical mechanical polishing/planarizing (CMP) system according to one or more aspects of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features. Still further, when a number or a range of numbers is described with "about," "approximate," and the like, the term is intended to encompass numbers that are within a reasonable range including the number described, such as within +/−10% of the number described or other values as understood by person skilled in the art. For example, the term "about 5 nm" encompasses the dimension range from 4.5 nm to 5.5 nm.

It is also noted that the present disclosure presents embodiments of performing chemical mechanical polishing/planarizing (CMP) processes useful for the fabrication of planar, three-dimensional, multi-gate, gate-all-around (GAA), Omega-gate (Ω-gate), or Pi-gate (Π-gate) devices. In some embodiments, such a device may include a p-type metal-oxide-semiconductor (PMOS) device and/or an n-type metal-oxide-semiconductor (NMOS) device. In one example, the present disclosure is directed to a FinFET device. Embodiments of the present disclosure may be equally applicable to fabrication of other devices not discussed above.

Referring to FIG. 1, a CMP system 100 is illustrated. It is understood that the FIG. 1 is only an example, and other embodiments of a CMP system and removal mechanism are also within the scope of the present disclosure. The CMP system 100 includes a slurry source 102 configured to distribute a slurry 104 onto a surface of a polishing pad 106. In the present disclosure, the slurry 104 includes at least a plurality of abrasive particles and a solvent (e.g., an oxidant) configured to carry the abrasive particles when an external force is applied to the slurry 104. As shown in FIG. 1, the polishing pad 106 is disposed on a platen 108, which rotates the polishing pad 106 about an axis of rotation 110 during operation of the CMP system 100. The rotation of the polishing pad 106 transports the slurry 104 underneath a semiconductor substrate (hereafter referred to as "substrate") 112. Thus, the polishing pad 106, in conjunction with the slurry 104, serves to polish the substrate 112. In some embodiments, the substrate 112 includes a silicon wafer. Alternatively, the substrate 112 may include a silicon germanium wafer or other semiconductor wafers. The substrate 112 may additionally include various features of an IC. For example, the substrate 112 may include various doped features in the silicon or silicon germanium wafer and may additionally include others features, such as metal gate stack, source/drain (S/D) features, dielectric features, interconnect structures, other suitable features, or combinations thereof.

The CMP system 100 further includes a workpiece carrier 116 that is configured to house the substrate 112 during the CMP process. In various embodiments, the substrate 112 is positioned in an upside-down orientation within the workpiece carrier 116 so that a top surface of the substrate 112 faces the polishing pad 106. By way of example, the workpiece carrier 116 is operable to bring the substrate 112 into contact with the polishing pad 106 such that the top surface of the substrate 112 contacts the polishing pad 106 while the polishing pad 106 rotates. By bringing the substrate 112 into contact with the rotating polishing pad 106, polishing of the substrate 112 is achieved. Additionally, in some embodiments, the workpiece carrier 116 may also be rotated during operation of the CMP system 100 about an axis of rotation 120.

A plurality of asperities at the surface of the polishing pad 106 represent contact points between the polishing pad 106 and the surface of the substrate 112. As such, the number, morphology, and distribution of the asperities play an important role in maintaining a satisfactory removal rate, eliminating hydroplaning of the slurry 104 across the surface of the substrate 112, and/or facilitating the flow of the slurry 104 between the polishing pad 106 and the substrate 112. However, as the polishing pad is continuously applied during the polishing process, the conditions of the asperities may deteriorate over time, compromising the overall result of the CMP process. In one example, the number of asperities may decrease during the lifetime of the polishing pad 106. Additionally, asperities with pointed profile may penetrate the substrate 112, causing adverse effects such as dishing and erosion.

Generally, a pad conditioner that includes a diamond grit is periodically brought into contact with the polishing pad 106 during the implementation of a CMP process to create and/or maintain the roughness of the polishing pad 106. In some examples, the polishing pad 106 may need to be roughened by the pad conditioner before it is used for the first time since it generally has a substantially flat, featureless surface. While the use of the pad conditioner has generally been adequate, it is not satisfactory in all aspects. For example, interplay of many factors such as magnitude of applied force, duration of application, and/or the structure of the pad conditioner may confound the result of the conditioning process, making it difficult to control the final topography of the polishing pad 106. The present disclosure provides methods of forming a CMP polishing pad that does not rely on the use of a pad conditioner to provide surface roughness important for the effective polishing and/or planarization of the substrate 112.

Figure 2:
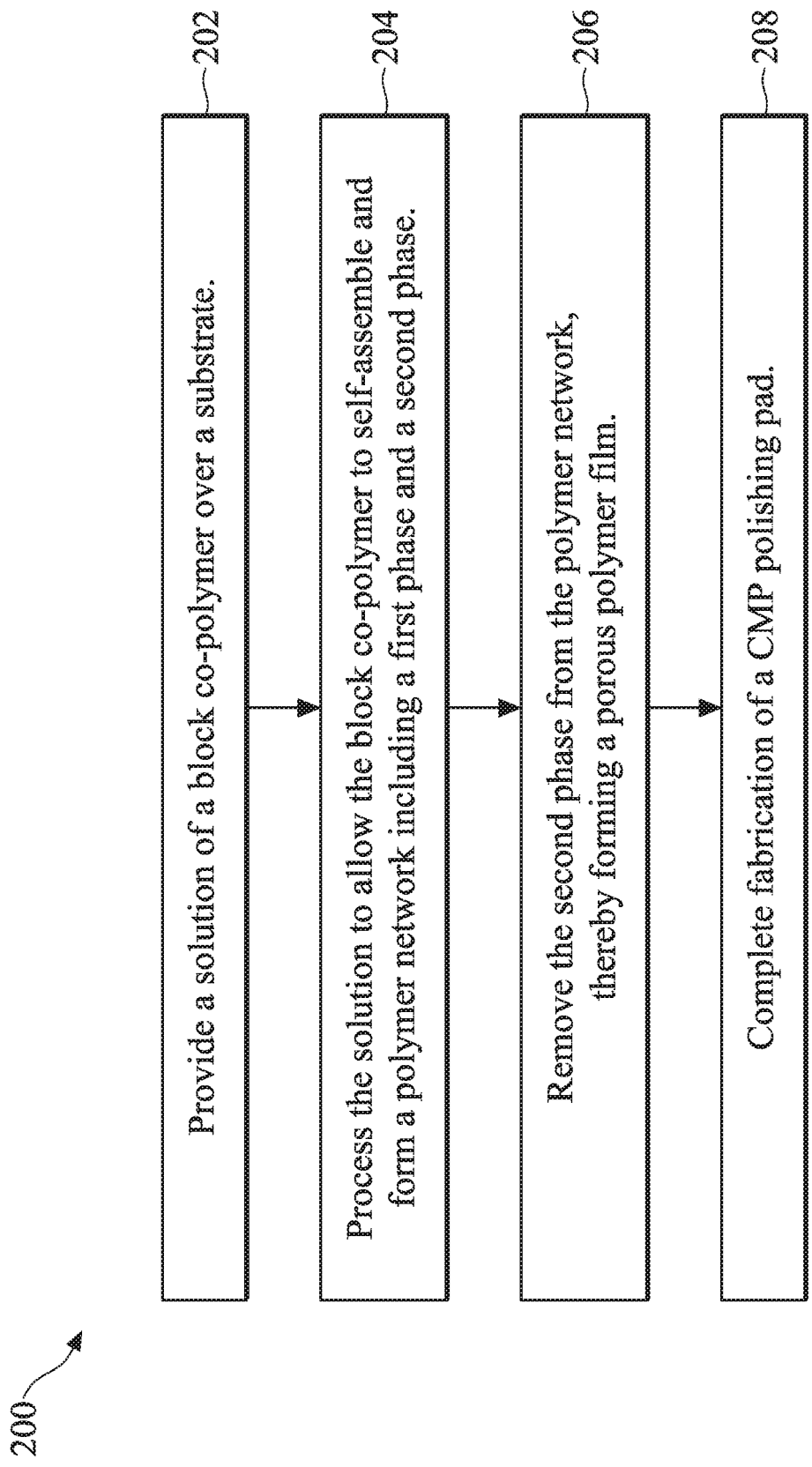
FIG. 2 is a flow chart of an example method of fabricating a CMP top pad according to one or more aspects of the present disclosure.

Referring now to FIG. 2, illustrated herein is a method 200 of a process in accordance with one or more of the embodiments described herein. In the present disclosure, the method 200 is directed to a method of fabricating a CMP top pad 300, which is substantially similar in function to a top portion of the polishing pad 106 (i.e., the portion in contact with the substrate 112) discussed above with respect to FIG. 1. Embodiments of intermediate steps of the method 200 are depicted and discussed with reference to FIGS. 3-6C. It is understood that the method 200 may include additional steps performed before, after, and/or during the method 200. It is further understood that the process steps of method 200 are merely examples and are not intended to be limiting beyond what is specifically recited in the claims that follow.

Figure 3:
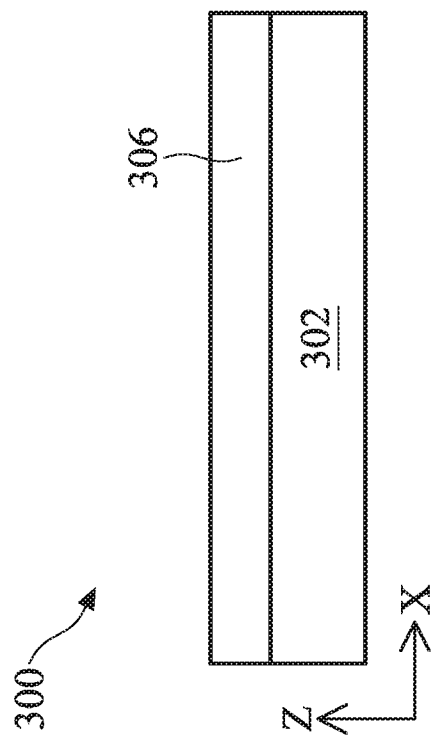
FIGS. 3, 4, and 5A are cross-sectional views of an example device during intermediate stages of the example method of FIG. 2 according to one or more aspects of the present disclosure.
Figures 6A, 6B, 6C:
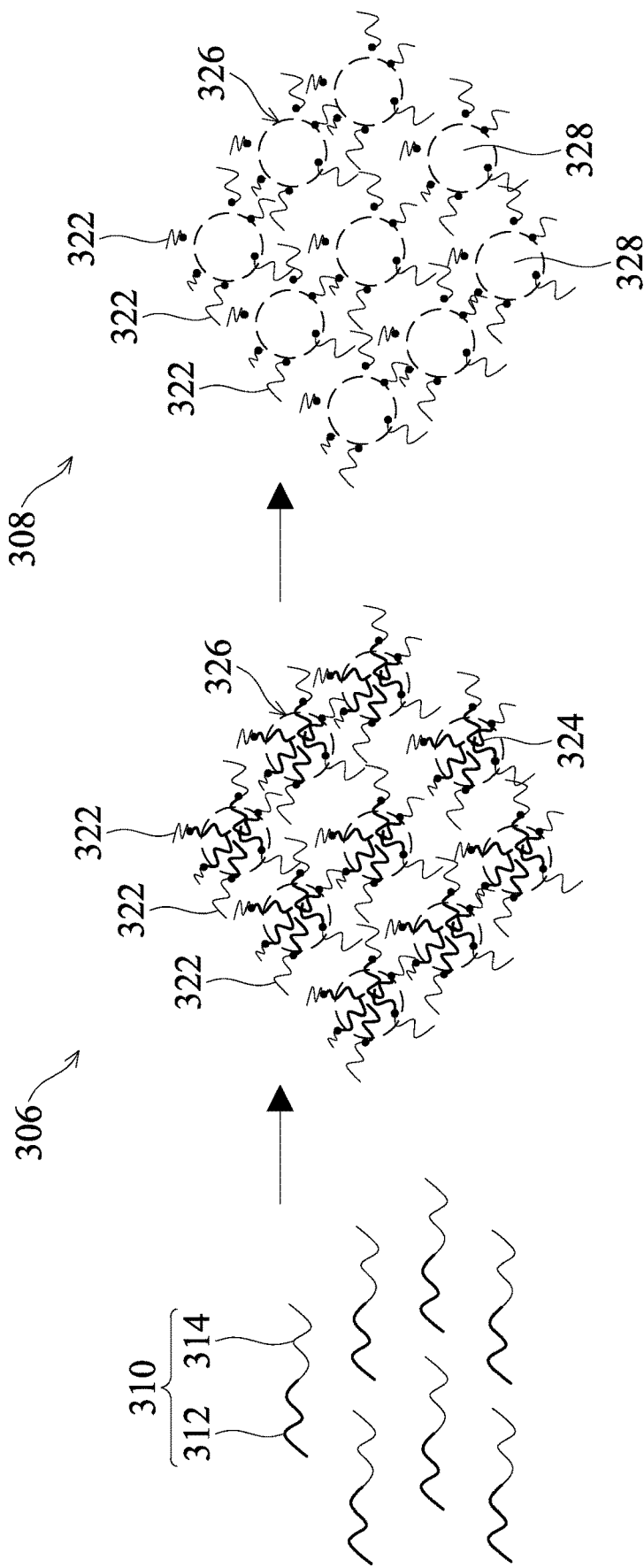
FIGS. 6A, 6B, and 6C are schematic illustrations of portions an example device during intermediate stages of the example method of FIG. 2 according to one or more aspects of the present disclosure.

Referring to FIGS. 2, 3, and 6A, the method 200 at block 202 provides a solution 304 of block co-copolymer (BCP) 310 over a substrate 302. The substrate 302 may be any suitable surface configured to provide support for the solution 304. In some examples, the substrate 302 includes a substantially flat, non-reactive surface. It is noted that, in the present embodiments, the substrate 302 simply provides a support surface for the subsequent processing of the BCP 310 and is not included in the eventual structure of the CMP top pad 300. In the present embodiments, the solution 304 includes BCP 310 dissolved in a solvent operable to be spread across a top surface of the substrate 302. The solvent may include chloroform, dimethyl sulfoxide, chlorobenzene, other suitable solvents, or combinations thereof. In the present embodiments, the solution 304 may be spread or dispersed over the top surface of the substrate 302 by solution casting, spin-coating, other suitable methods, or combinations thereof. An amount of the solution 304 provided over the top surface of the substrate 302 determines a final thickness of the polymer film 308 (see FIG. 5A) and is thus not limited to any particular dimension in the present disclosure.

As depicted in FIG. 6A, the BCP 310 includes a first segment 312 and a second segment 314 connected to the first segment 312. Notably, the first segment 312 and the second segment 314 have different chemical compositions as discussed in detail below. Each of the first segment 312 and the second segment 314 may include multiple repeating units of a monomer. In the present embodiments, the first segment 312 and the second segment 314 include functional groups that would otherwise repel each other chemically, such that each of the first segments 312 favors interaction with other first segments 312 rather than with a second segment 314. In other words, molecular interactions such as van der Waals force drives segments of the same or substantially similar compositions (i.e., all first segments 312 or all second segments 314) to aggregate and segments of different compositions to segregate. In some embodiments, the first segment 312 includes polycarbonates, polyamides (e.g., nylons), polysulfones, polyurethanes, other suitable polymers, or combinations thereof, and the second segment 314 includes polylactic acid, polymethylmethacrylate, polybutylene, polyisoprene, other suitable polymers, or combinations thereof. In some embodiments, the second segment 314 includes a tertiary carbon. In some embodiments, the second segment 314 separates from the first segment 312 when the BCP 310 is exposed to an applied energy source or a chemical agent. It is understood that the term "polymer" used herein simply denotes that more than one monomer may be included in the first segment 312 or the second segment 314 and does not imply a particular number of monomers is needed to form such segment.

In some embodiments, a molecular weight (MW) of each of the first segment 312 and the second segment 314 may range from about $1\times10^3$ g/mol to about $1\times10^8$ g/mol. On one hand, if the MW is less than about $1\times10^3$ g/mol, the solution 304 may not provide favorable condition for polymerization. On the other hand, if the MW is greater than about $1\times10^8$ g/mol, the solution 304 may become too viscous to undergo solution casting. Notably, in the present embodiments, the relative amount of the first segment 312 with respect to the second segment 314 affects the final morphology of the polymer film 308 (see FIG. 5A). In some examples, the ratio of the amount of the first segment 312 to the amount of the second segment 314 is about 1:1 to about 10:1. In some embodiments, the amount of the first segment 312 is greater than the amount of the second segment 314 in the BCP 310 such that the ratio of the amount of the first segment 312 to the amount of the second segment 314 is about 5:3 to about 2:1. Significance of such ratios will be discussed below with reference to subsequent processing steps of the method 200.

Figure 4:
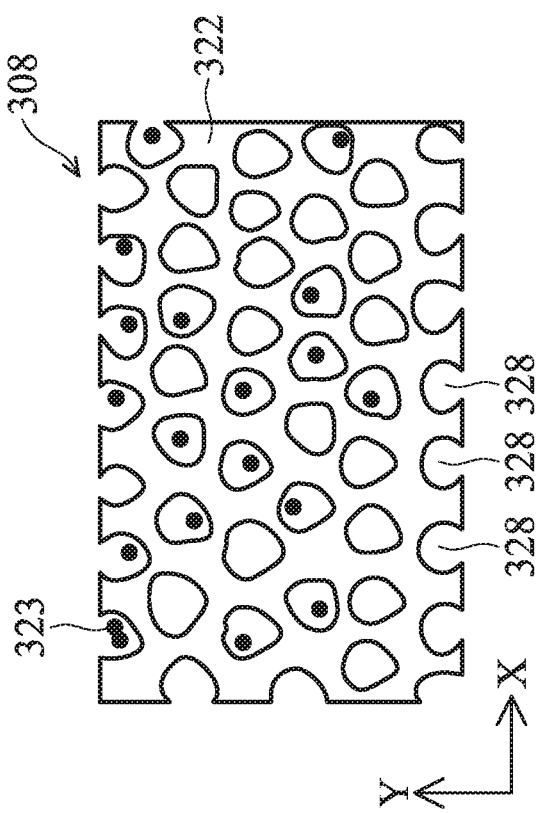

Now referring to FIGS. 2, 4 and 6B, the method 200 at block 204 processes the solution 304 to allow the BCP 310 to self-assemble and reach thermodynamic equilibrium, thereby forming a polymer network 306. In the present disclosure, the method 200 implements a thermal annealing process and/or a solvent evaporation process to supply thermodynamic driving force and/or ample time for the BCP 310 to self-assemble. The term "self-assemble" as used herein refers to a spontaneous process during which co-polymers including chemically distinct polymer segments, such as the first segment 312 and the second segment 314, reorganize themselves according to the molecular forces (e.g., van der Waals force) experienced between the different polymer segments. Once thermodynamic equilibrium is reached, the initially blended co-polymers separate into phases (or microphases, depending upon sizes of the segments), creating chemically distinct domains within the polymer network.

Referring to FIG. 6B, individual polymer chains of the BCP 310 self-assemble to form a first phase 322 and a second phase 324, respectively. As depicted herein, the first phase 322 includes the first segment 312 and the second phase 324 includes the second segment 314. In the present embodiments, the second phase 324 is configured to form regions 326 (dotted line) embedded in the first phase 322. In other words, following the processing of the solution 304 at block 204, the polymer network 306 self-assemble into two distinct phases: one continuous phase (the second phase 324) embedded in another continuous phase (the first phase 322). It is noted that the regions 326 are merely schematic representations to showcase the separation between the first phase 322 and the second phase 324 and not intended to describe specific shapes of the second phase 324. The first phase 322 and the second phase 324 may segregate into distinct morphologies depending upon one or more factors of the BCP 310 such as, for example, the relative amounts of the various segments of the BCP, the specific chemical affinity afforded by the various blocks, the relative sizes of the various blocks, etc. In the depicted embodiment, as the ratio of the amount of the first segment 312 to the amount of the second segment 314 is about 1:1 to about 10:1, the first phase 322 and the second phase 324 self-assemble into a gyroid morphology where the second phase 324 is embedded the first phase 322. Of course, other morphologies may also be possible results of the self-assembly process discussed herein such as, for example, cylindrical, spherical, lamellar, etc.

In some embodiments, the method 200 at block 204 implements a thermal annealing process to encourage the BCP 310 in the solution 304 (see FIG. 6A) to self-assemble into the polymer network 306. The thermal annealing process may be implemented at a temperature T greater than the glass transition temperature $T_g$ of the BCP 310. In some embodiments, the temperature T is from about 50 degrees Celsius to about 300 degrees Celsius. Of course, other temperatures may also be applicable to the present disclosure so long as they satisfy the condition $T>T_g$ for a given composition of the BCP 310. At $T>T_g$, the BCP 310 gain enough thermal energy to mobilize, allowing the first segments 312 and the second segments 314 to move past each other and segregate according to their distinct chemical natures. The thermal annealing process may be implemented by laser anneal, rapid thermal anneal (RTA), spike anneal, other suitable annealing methods, or combinations thereof. In some embodiments, before implementing the thermal annealing process, the method 200 removes at least a portion of the solvent in the solution 304 by way of a heat treatment (e.g., baking in an oven). Notably, the heat treatment implemented before the thermal annealing process is not implemented at a temperature above the $T_g$ of the BCP 310 and is thus not configured to induce segments of the BCP 310 to self-assemble into distinct phases as depicted in FIG. 6B.

In some embodiments, the method 200 at block 204 induces the BCP 310 to self-assemble by combining a mixture of solvents having different rates of evaporation to form the solution 304 such that the rate of evaporation of the resulting solution 304 allows sufficient time for the BCP 310 to self-assemble. The mixture of solvents, as disclosed herein, includes at least one of chloroform, dimethyl sulfoxide, chlorobenzene, and other suitable solvents.

Now referring to FIGS. 2, 5A, 5B, and 6C, the method 200 at block 206 removes the second phase 324 from the polymer network 306 to form a polymer film 308 over the substrate 302. In the present embodiments, the method 200 at block 206 does not or does not substantially remove the first phase 322 from the polymer network 306 such that, when viewed in a two-dimensional top view (FIG. 5B), the resulting polymer film 308 includes pores 328 (i.e., void left behind by the removal of the second phase 324) dispersed in a polymer matrix that includes the first phase 322. It is noted that, when viewed in a cross-sectional view (not depicted), the pores 328 extend through the thickness of the polymer network 306 while being embedded in the first phase 322. The method 200 may implement one or more of the processes discussed below to degrade the second phase 324, followed by a cleaning process to remove the degraded second phase 324 from the polymer film 308. In the present embodiments, methods of degrading the second phase 324 are configured to attack portions of the second segment 314 that include susceptible chemical bonds. In one example, one or more of the process discussed below may specifically interact with tertiary carbons in the second segment 314, causing chain scission to occur. In another example, one or more of the process discussed below may specifically interact with C=C bonds in the second segment 314 to break the BCP 310. In some embodiments, the cleaning process may implement an aqueous solution that includes additives such as surfactants.

Figure 5A:
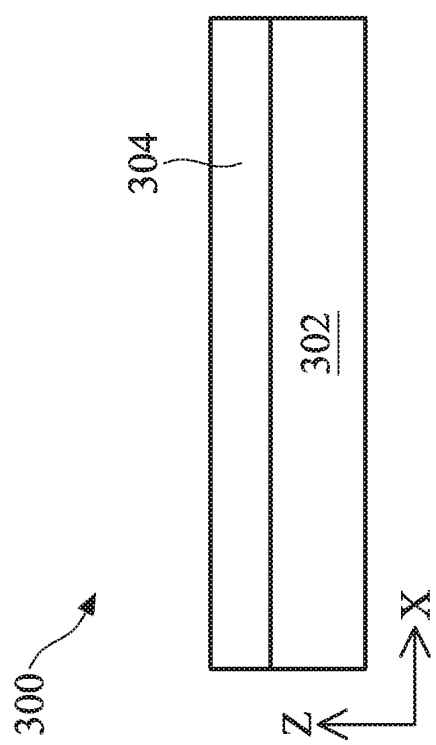
Figure 5B:
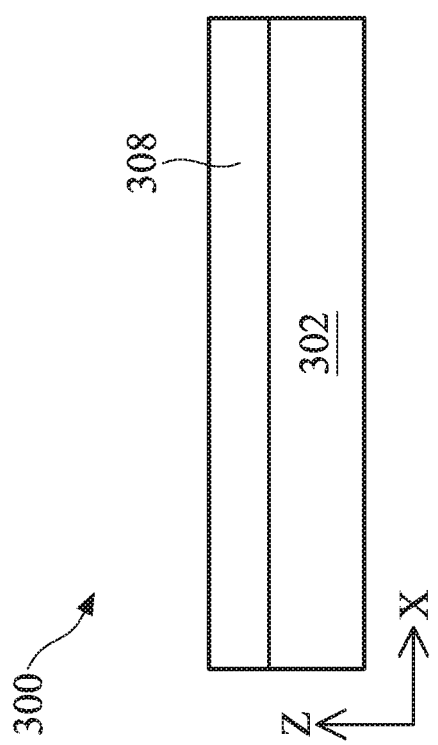
FIG. 5B is a top view of the example device of FIG. 5A at an intermediate stage of the example method of FIG. 2 according to one or more aspects of the present disclosure.

In the present embodiments, because the amount of the second phase 324 depends upon the amount of the second segment 314, sizes of the pores 328 may be controlled with uniformity by adjusting the amount (e.g., molecular weight) of the second segment 314 in the BCP 310, where larger pore sizes may be afforded by greater molecular weight. Notably, compared to pores having sizes in the micron range, pores provided in the present disclosure are significantly smaller, increasing the contact area between the polishing pad and the abrasive particles. Additionally, smaller pore sizes may help reduce occurrences of inadvertent scratch, dishing, and erosion during the CMP process. In some example, sizes of the pores 328 may be about 20 nm to about 200 nm in diameter. In some embodiments, as depicted in FIG. 5B, sizes of the pores 328 are on similar length scale as those of the abrasive particles 323. For example, a ratio of the sizes of the pores 328 to those of the abrasive particles is at least about one but not more than about 50. In some examples, a ratio of the size of the pores 328 to an overall thickness of the polymer film 308 is about $8 \times 10^{-8}$ to about $4 \times 10^{-5}$. Furthermore, because sizes of the pores 328 may be adjusted by altering molecular composition of the BCP 310, the CMP top pad 300 provided herein can be easily tailored to various stages of the polishing process. In some embodiments, a concentration (i.e., volume fraction) of the pores 328 in the polymer film 308 is about 5% to about 50%. Notably, concentrations exceeding about 50% may lead to poor structural integrity and subsequent collapsing of the polymer film 308. On the other hand, if the volume fraction of the pores 328 is less than about 5%, the loading ability of abrasive particles 323 and, in turn, the overall removal rate, may be compromised.

In some embodiments, the method 200 removes the second phase 324 by applying an ultraviolet (UV) treatment to the polymer network 306. The polymer network 306 may be irradiated with a UV source at any suitable wavelength, such as at about 254 nm or at about 365 nm. In some embodiments, the method 200 removes the second phase 324 by applying an ozone (O3) treatment to the polymer network 306. Notably, the ozone treatment may be implemented in air or in water, depending upon specific polymer segments included in the BCP 310. In an example embodiment, the concentration of ozone is about 10 ppm (parts per million) to about 100 ppm if implemented in water, and about 10 ppm to about $1 \times 10^5$ ppm in air. Of course, other concentrations of ozone may also be applicable to the present embodiments.

In some embodiments, the method 200 removes the second phase 324 by inducing a hydrolysis reaction between the BCP 310 (in particular, the second segments 314 of the BCP 310) and an applied solution. In some embodiments, the applied solution is an alkaline-based solution. In example embodiments, the applied alkaline-based solution includes sodium hydroxide, potassium hydroxide, ammonium hydroxide, calcium hydroxide, magnesium hydroxide, other suitable alkaline compounds, or combinations thereof. In some examples, a concentration of the alkaline-based solution is about 0.1 M to about 10 M. Of course, other concentrations of alkaline-solutions may also applicable to the present embodiments.

Referring to FIG. 5B, which is a schematic top view of the polymer film 308, the first phase 322 remaining in the polymer film 308 forms asperities separated by the pores 328. As discussed above, asperities present at the surface of a CMP polishing pad are responsible for facilitating the movement of abrasive particles across the surface of a substrate (e.g., the substrate 112 in FIG. 1) to be polished. Thus, the size and distribution of the asperities are important for determining the effectiveness of the polishing results. In the present embodiments, when self-assembly of the BCP 310 in the solution 304 reaches thermodynamic equilibrium, the resulting three-dimensional, interpenetrating structure (e.g., a gyroid structure) forms a substantially periodic pattern comprising both the first phase 322 and the second phase 324 when viewed at a two-dimensional surface. The term "periodic" indicates that features are substantially equidistant from each other. Then, after removing the second phase 324 from the polymer network 306, the resulting polymer film 308 includes periodic asperities arising from the first phase 322 and separated by space (the pores 328) that once was occupied by the second phase 324.

Thereafter, referring back to FIG. 2, the method 200 at operation 208 completes fabrication of the CMP top pad 300. The method 200 may implement any suitable processing steps for meeting the design requirements for the CMP top pad 300. In some embodiments, for example, the method 200 removes the polymer film 308 from the substrate 302 and proceeds to remove the topmost and the bottommost portions of the polymer film 308 to ensure that the resulting polymer film 308 obtains pristine surfaces for subsequent fabrication processes. In an example embodiment, a final thickness of the polymer film 308 after the removal of the topmost and the bottommost portions is about 50 mils or about 1.27 mm. In some embodiments, a ratio of the size of the pores 328 to the thickness of the polymer film 308 is about 8E-8 to about 4E-5.

Thereafter, in some embodiments, the method 200 may bond the polymer film 308 (i.e., the CMP top pad 300) to a CMP sub-pad (not depicted) by the use of a suitable adhesive. In this regard, the CMP sub-pad simply acts as a support the polymer film 308 and may be fabricated by conventional methods that include injection-molding a suitable polymer resin to a configuration compatible with other components of a CMP system, such as the CMP system 100, as discussed above with respect to FIG. 1. In some examples, the polymer that comprises CMP sub-pad may include the first segments 312 and/or the second segments 314 but is free of structures such as the network of pores and asperities similar to those discussed with respect to the polymer film 308. In other words, the CMP sub-pad is substantially a non-pores structure in comparison to the CMP top pad 300. In some embodiments, the suitable adhesive may serve as a transition layer for bonding the CMP top pad 300 to the CMP sub-pad.

Figure 7:
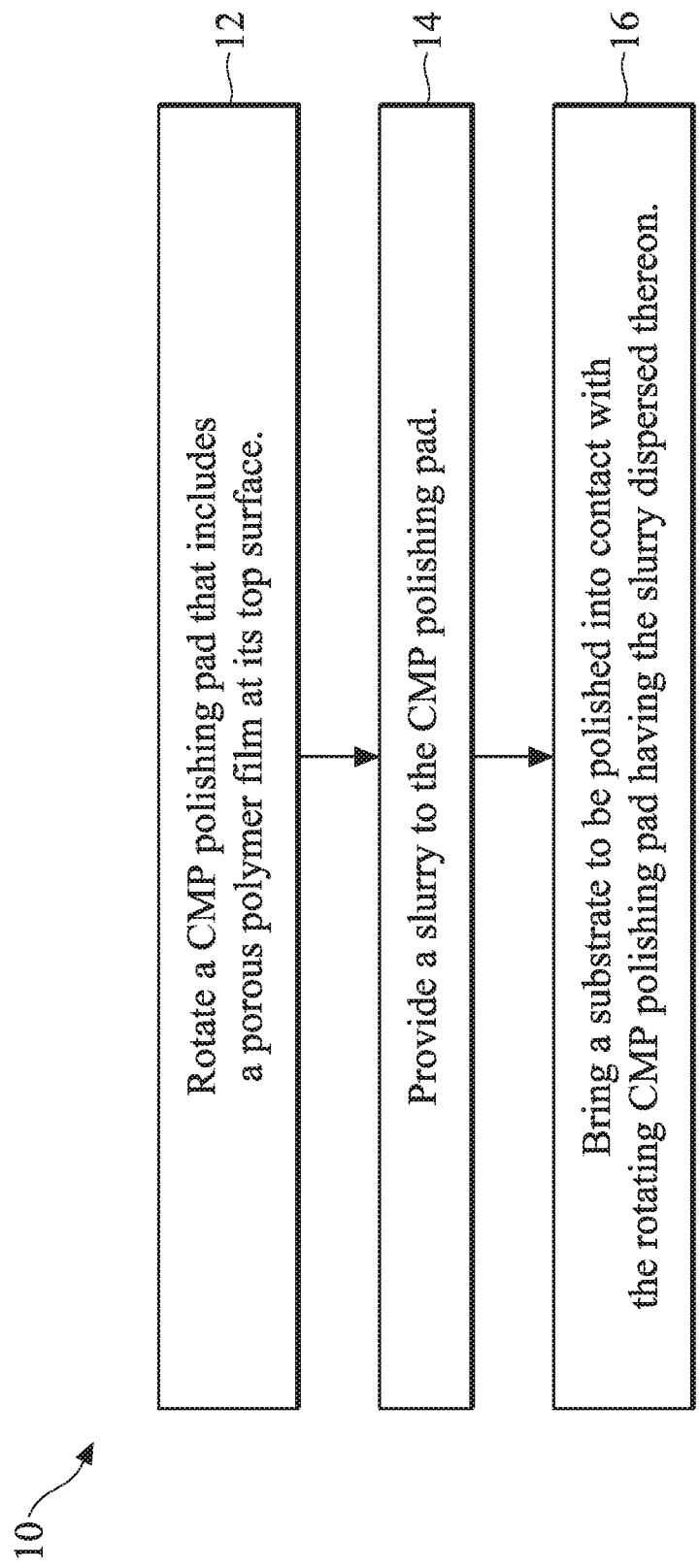
FIG. 7 is a flow chart of an example method of performing a CMP process according to one or more aspects of the present disclosure.

Referring now to FIG. 7, illustrated therein is a method 10 of a CMP process in accordance with one or more of the embodiments described herein. In various examples, the method 10 implements a CMP process utilizing the CMP system 100 as discussed above with respect to FIG. 1. It is understood that the method 10 may include additional steps performed before, after, and/or during the method 10. It is further understood that the process steps of method 10 are merely examples and are not intended to be limiting beyond what is specifically recited in the claims that follow.

Referring to FIGS. 1 and 7, the method 10 begins at block 12 where the platen 108 having the polishing pad 106 disposed thereon is rotated about the axis of rotation 110. In the present embodiments, the method 10 implements a polishing pad 106 that includes the CMP top pad 300 fabricated using the method 200 as discussed above with respect to FIGS. 3-6C.

The method 10 then proceeds to block 14 where slurry 104 including at least an oxidant and a plurality of abrasive particles is provided to the polishing pad 106, which includes the CMP top pad 300 as discussed above. By way of example, referring to FIG. 1, the slurry source 102 may distribute the slurry 104 including the oxidant and the abrasive particles onto the surface of the polishing pad 106, such that the rotation of the platen 108 disperses the slurry 104 across the top surface of the polishing pad 106. The oxidant may include any suitable oxidizer, such as hydrogen peroxide, and/or a compound comprising an alkali metal (e.g., sodium, potassium, etc.) and one or more of the following ions: $IO_4^-$, $IO_3^-$, $ClO^-$, $NO_3^-$, $Cl^-$, $CO_3^{2-}$, $SO_4^{2-}$. The abrasive particles may each include any suitable material, such as $Al_2O_3$, $SiO_2$, other suitable materials, or combinations thereof. The slurry 104 may further include other additives, such as an organic complexant, a chelating agent, an organic or inorganic acid/base, a corrosion inhibitor, a buffer, other suitable additives, or combinations thereof.

Still referring to FIGS. 1 and 7, the method 10 then proceeds to block 16 where the substrate 112 is brought into contact with the rotating polishing pad 106 having the slurry 104 dispersed thereon. Upon contacting the polishing pad 106, the substrate 112 is polished by the polishing pad 106 using the slurry 104 as a polishing medium. In an example embodiment, the oxidant in the slurry 104 may react with portions of the substrate 112, which are subsequently removed by the abrasive particles included in the slurry 104. In some embodiments, the method 10 implements block 16 in a series of operations using polishing pads that includes the CMP top pad 300 having varying pore sizes (i.e., sizes of the pores 328). For example, sizes of the pores 328 in the CMP top pad 300 may gradually decrease as the method 10 proceeds to polishing the substrate 112 at block 16. In the present embodiments, as the substrate 112 is polished, top portions of the CMP top pad 300 (i.e., the polymer film 308) may wear away due to actions of the abrasive particles; however, because the structure of the CMP top pad 300 is a three-dimensional porous film having periodic features, surface roughness of the polymer film 308 provided by the asperities (i.e., the first phase 322) and the pores 328 are consistent throughout its thickness, thus eliminating the need for conditioning the polishing pad 106.

Figure 8:
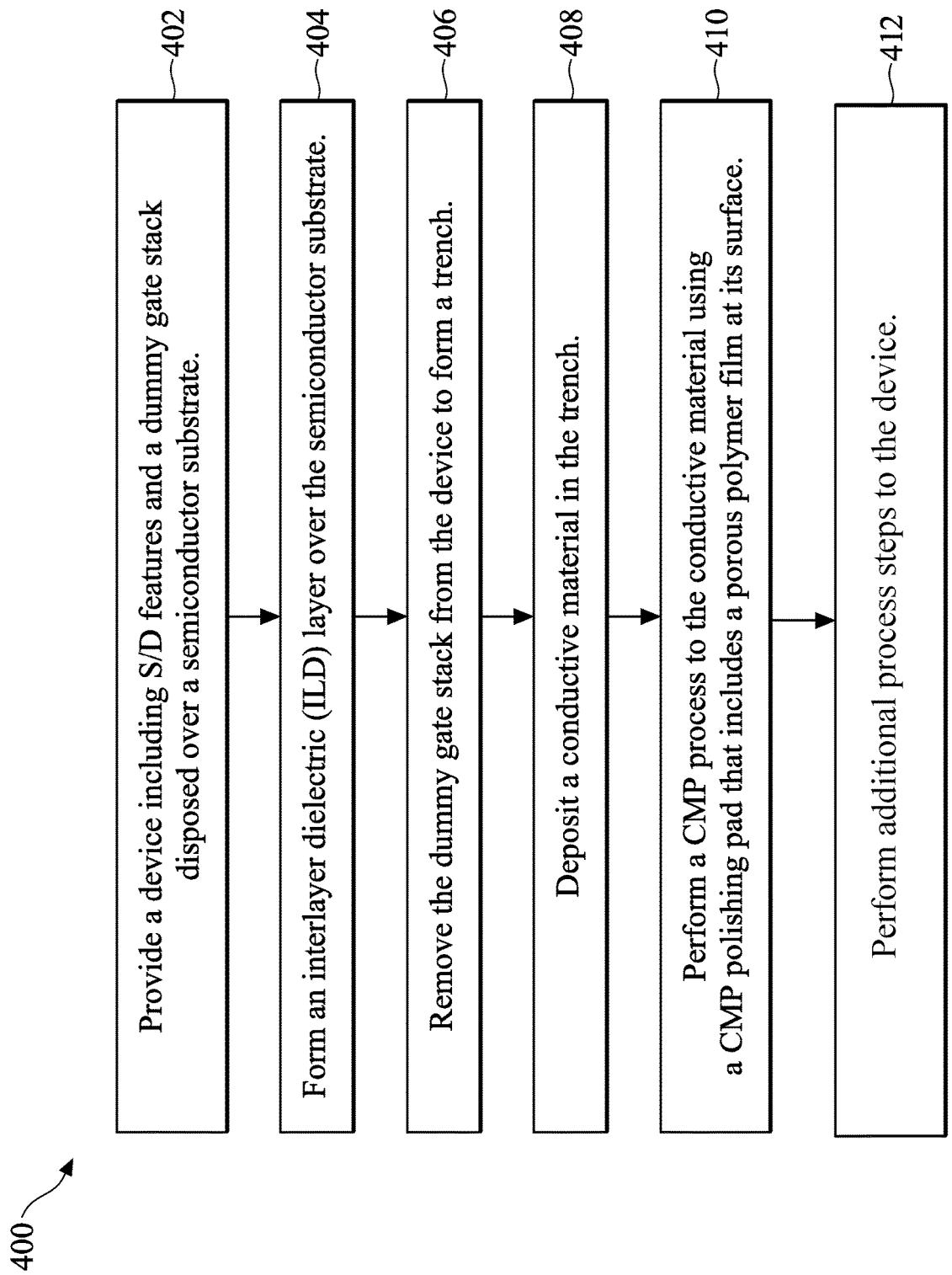
FIG. 8 is a flow chart of a method of fabricating a semiconductor device including performing an example CMP process according to one or more aspects of the present disclosure.

Referring now to FIG. 8, illustrated therein is a method 400 for fabricating a semiconductor device 500 (hereafter referred to as the "device 500") using a CMP process that implements a polishing pad including an embodiment of the polymer film 308 as provided herein. It is understood that the method 400 includes steps of fabricating features of a complementary metal-oxide-semiconductor (CMOS) technology process flow and thus, are only described briefly herein. It is understood that the process steps of method 400 are merely exemplary and are not intended to be limiting beyond what is specifically recited in the claims that follow. It is further understood that additional steps may be performed before, after, and/or during the method 400.

FIGS. 9A-9F are cross-sectional views of an embodiment of the device 500 at intermediate stages of an embodiment of the method 400. It is understood that, though not depicted, the device 500 may include various other devices and features, such as other types of devices such as additional transistors, bipolar junction transistors, resistors, capacitors, inductors, diodes, fuses, static random access memory (SRAM) and/or other logic circuits, etc., but is simplified for a better understanding of the inventive concepts of the present disclosure. In some embodiments, the device 500 includes a plurality of semiconductor devices (e.g., transistors) such as PFETs, NFETs, etc., which may be interconnected. Moreover, it is noted that the process steps of the method 400, including any descriptions given with reference to FIGS. 9A-9F, are merely exemplary and are not intended to be limiting beyond what is specifically recited in the claims that follow.

Figure 9A:
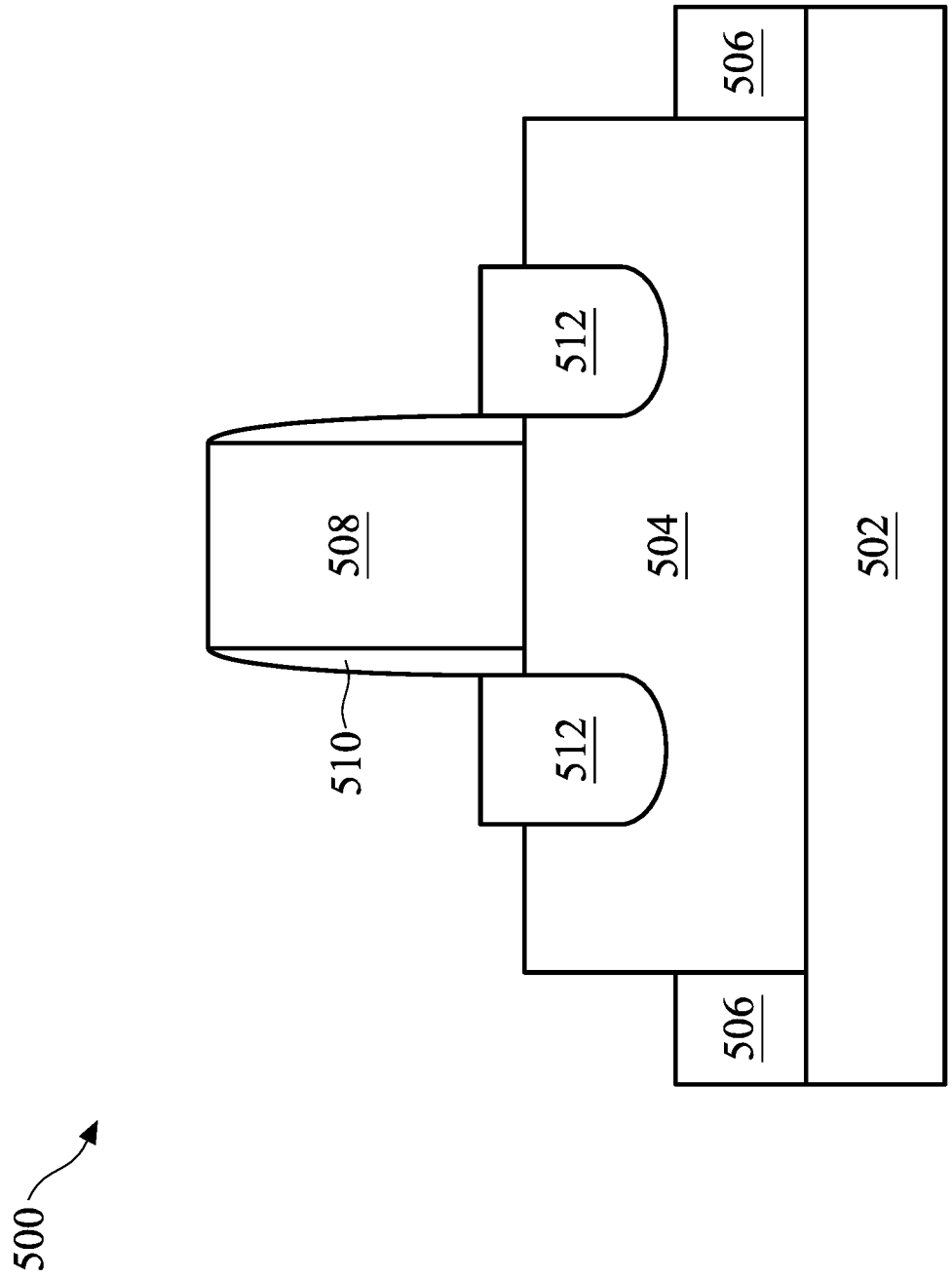
FIGS. 9A, 9B, 9C, 9D, 9E, and 9F illustrate cross-section views of an example a semiconductor device during intermediate stages of the example method of FIG. 8 according to one or more aspects of the present disclosure.

Referring to FIGS. 8 and 9A, the method 400 at block 402 provides (or is provided with) the device 500 that includes a semiconductor layer 504 disposed over a substrate 502, an isolation region 506 disposed over the substrate 502, a dummy gate stack 508 disposed over the semiconductor layer 504 and between source/drain (S/D) features 512, and gate spacers 510 disposed on sidewalls of the dummy gate stack 508. Though not depicted herein, additional material layers such as an interfacial layer, a hard mask layer, a dummy gate dielectric layer, other suitable layers, or combinations thereof may also be included in the device 500. In the present embodiments, the semiconductor layer 504 includes a semiconductor fin (hereafter referred to as "fin 504") configured to provide a three-dimensional FET. In alternative embodiments, the fin 504 provides a planar FET.

The substrate 502 may include an elementary (single element) semiconductor, such as silicon, germanium, other suitable materials, or combinations thereof; a compound semiconductor, such as silicon carbide, gallium arsenic, gallium phosphide, indium phosphide, indium arsenide, indium antimonide, other suitable materials, or combinations thereof; an alloy semiconductor, such as SiGe, GaAsP, AlInAs, AlGaAs, GaInAs, GaInP, GaInAsP, other suitable materials, or combinations thereof.

In some embodiments where the substrate 502 includes FETs, various doped regions, such as source/drain regions, are disposed in or on the substrate 502. The doped regions may be doped with n-type dopants, such as phosphorus or arsenic, and/or p-type dopants, such as boron or $BF_2$, depending on design requirements. The doped regions may be formed directly on the substrate 502, in a p-well structure, in an n-well structure, in a dual-well structure, or using a raised structure. Doped regions may be formed by implantation of dopant atoms, in-situ doped epitaxial growth, and/or other suitable techniques.

In some embodiments, the fin 504 may be fabricated using suitable processes including photolithography and etch processes. The photolithography process may include forming a photoresist layer (resist) overlying the substrate 502, exposing the resist to a pattern, performing post-exposure bake processes, and developing the resist to form a masking element (not shown) including the resist. The masking element is then used for etching recesses into the substrate 502, leaving the fin 504 on the substrate 502. The etching process may include dry etching, wet etching, reactive ion etching (RIE), and/or other suitable processes.

Numerous other embodiments of methods for forming the fins may be suitable. For example, the fins 504 may be patterned using double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers, or mandrels, may then be used to pattern the fins.

The isolation region 506 may include silicon oxide, silicon nitride, silicon oxynitride, fluoride-doped silicate glass (FSG), a low-k dielectric material, other suitable materials, or combinations thereof. The isolation region 506 may include shallow trench isolation (STI) features. In one embodiment, the isolation region 506 are formed by etching trenches in the substrate 502 during the formation of the fin 504. The trenches may then be filled with an isolating material described above by a deposition process, followed by a CMP process. Other isolation structure such as field oxide, local oxidation of silicon (LOCOS), and/or other suitable structures may also be implemented as the isolation region 506. The isolation region 506 may be deposited by any suitable method, such as chemical vapor deposition (CVD), flowable CVD (FCVD), spin-on-glass (SOG), other suitable methods, or combinations thereof.

The dummy gate stack 508 is provided as a placeholder for a high-k metal gate structure (HKMG) to be formed after other components of the device 500 are fabricated. The dummy gate stack 508 may include at least a polysilicon layer and, in some examples, may include an interfacial layer (not depicted) disposed between the polysilicon layer and the channel regions of the fin 504. The dummy gate stack 508 may be formed by first depositing a blanket of polysilicon layer over the device 500 and then performing an etching process to remove portions of the polysilicon layer from the device 500. After forming components such as the S/D features, portions of the dummy gate stack 508 are replaced with the HKMG in a series of processes to be discussed in detail below.

The gate spacers 510 may include a dielectric material, such as silicon oxide, silicon nitride, silicon carbide, silicon oxynitride, other suitable dielectric materials, or combinations thereof. The gate spacers 510 may be a single layered structure or a multi-layered structure. The gate spacers 510 may be formed by first depositing a blanket of spacer material over the device 500, and then performing an anisotropic etching process to remove portions of the spacer material to form the gate spacers 510 on sidewalls of the dummy gate stack 508.

The S/D features 512 may be suitable for forming a p-type FinFET (i.e., including a p-type epitaxial material) or alternatively, an n-type FinFET (i.e., including an n-type epitaxial material). The p-type epitaxial material may include one or more epitaxial layers of silicon germanium (epi SiGe), where the silicon germanium is doped with a p-type dopant such as boron, germanium, indium, other p-type dopants, or combinations thereof. The n-type epitaxial material may include one or more epitaxial layers of silicon (epi Si) or silicon carbon (epi SiC), where the silicon or silicon carbon is doped with an n-type dopant such as arsenic, phosphorus, other n-type dopants, or combinations thereof. Though not depicted, the device 500 may include additional p-type and/or n-type FETs. The S/D features 512 may be formed by any suitable techniques, such as etching processes followed by one or more epitaxy processes.

Figure 9B:
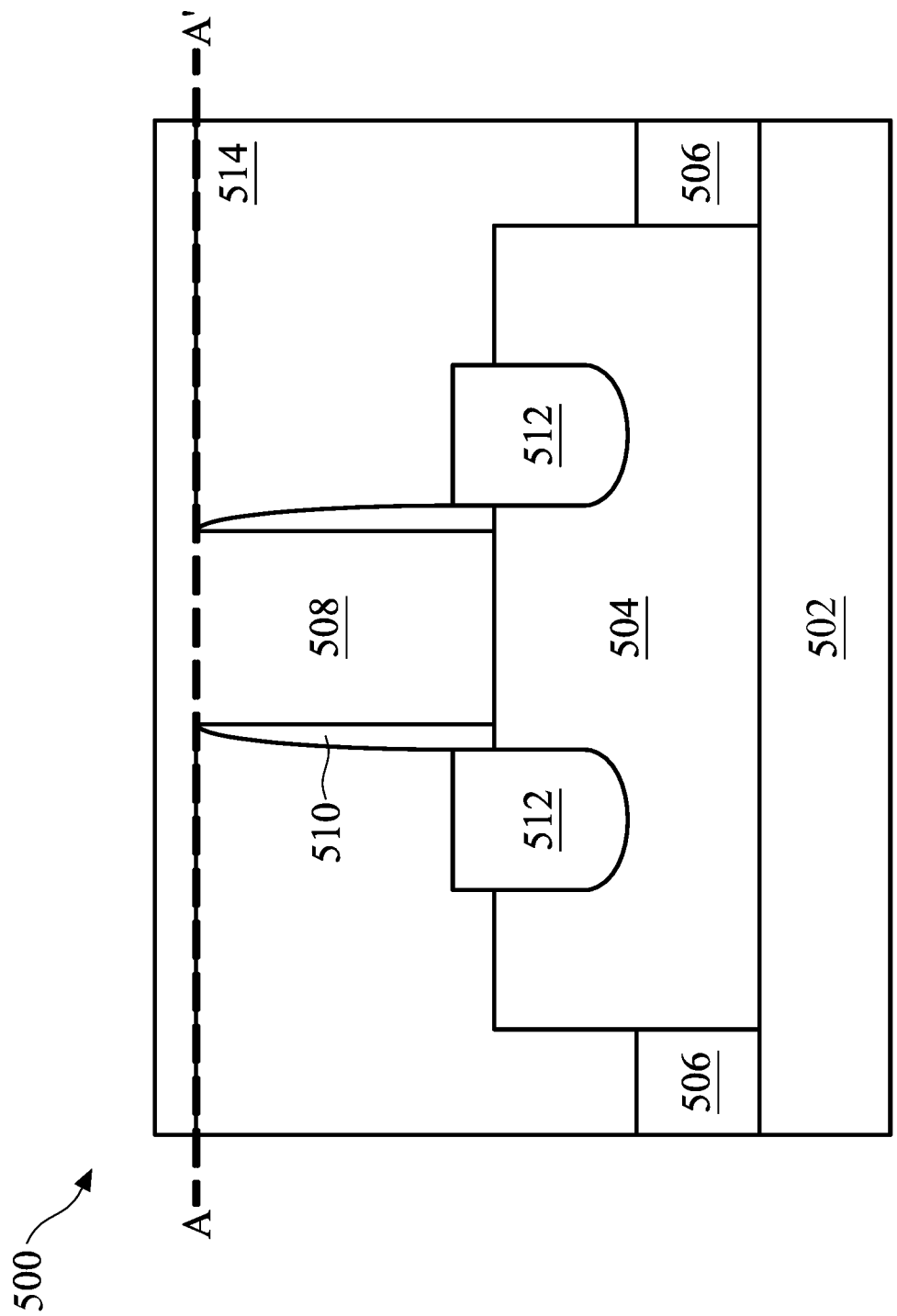

The subsequent processing steps are directed to an example embodiment of a gate replacement process during which the dummy gate stack 508 is removed and an HKMG is formed in its place. Referring to FIGS. 8 and 9B, the method 400 at block 404 forms an interlayer dielectric (ILD) layer 514 over the device 500. In some embodiments, the ILD layer 514 includes, for example, a low-k dielectric material. The ILD layer 514 may include a multilayer structure having multiple dielectric materials and may be formed by a deposition process such as, for example, CVD, FCVD, SOG, other suitable methods, or combinations thereof. In some embodiments, as depicted herein, portions of the ILD layer 514 are formed over the dummy gate stack 508 and subsequently removed from the device 500 along by a CMP process along a line AA' to expose a top surface of the dummy gate stack 508. The CMP process performed at block 404 is substantially similar to the method 10 discussed above with respect to FIG. 7, which is implemented using a polishing pad including an embodiment of the CMP top pad 300 provided herein.

Figure 9C:
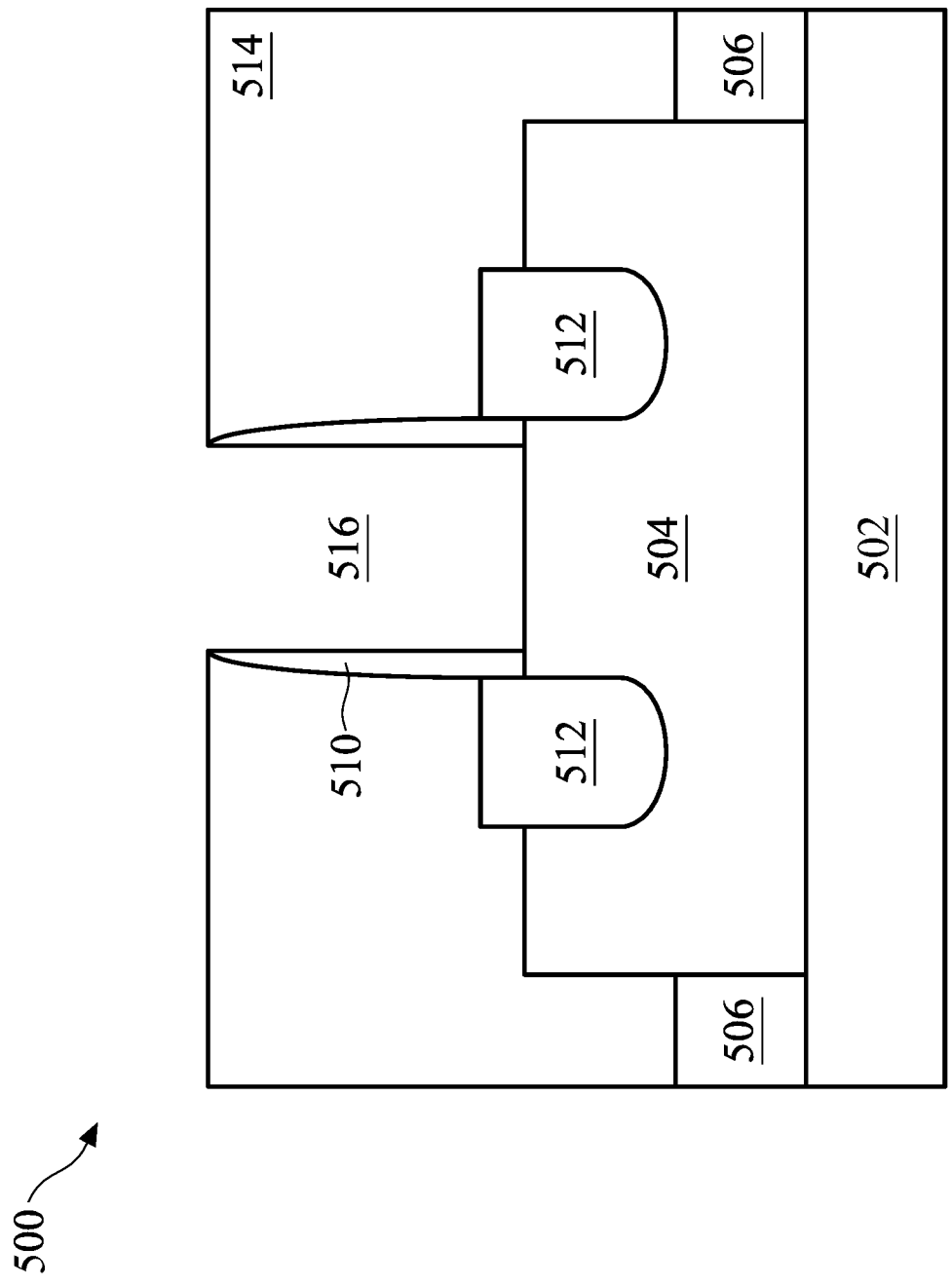

Now referring to FIGS. 8 and 9C, the method 400 at block 406 removes the dummy gate stack 508 to expose the channel region of the fin 504 in a gate trench 516. In some embodiments, a masking element (not depicted) is formed over the device 500 and patterned using a series of lithographic exposure and development processes to expose the dummy gate stack 508. The patterned masking element may then be used as an etch mask for removing the dummy gate stack 508 by one or more etching process such as a dry etching process, a wet etching process, an RIE process, other suitable processes, or combinations thereof. The patterned masking element may then be removed by a suitable method such as resist striping or plasma ashing.

Thereafter, referring to FIGS. 8 and 9D-9F, the method 400 at block 408 forms a HKMG 520 in the gate trench 516. The HKMG 520 may further include other material layers, such as a barrier layer, a glue layer, a hard mask layer, and/or a capping layer. The various layers of the HKMG 520 may be formed by any suitable method, such as CVD, ALD, PVD, plating, chemical oxidation, thermal oxidation, other suitable methods, or combinations thereof.

Figure 9D:
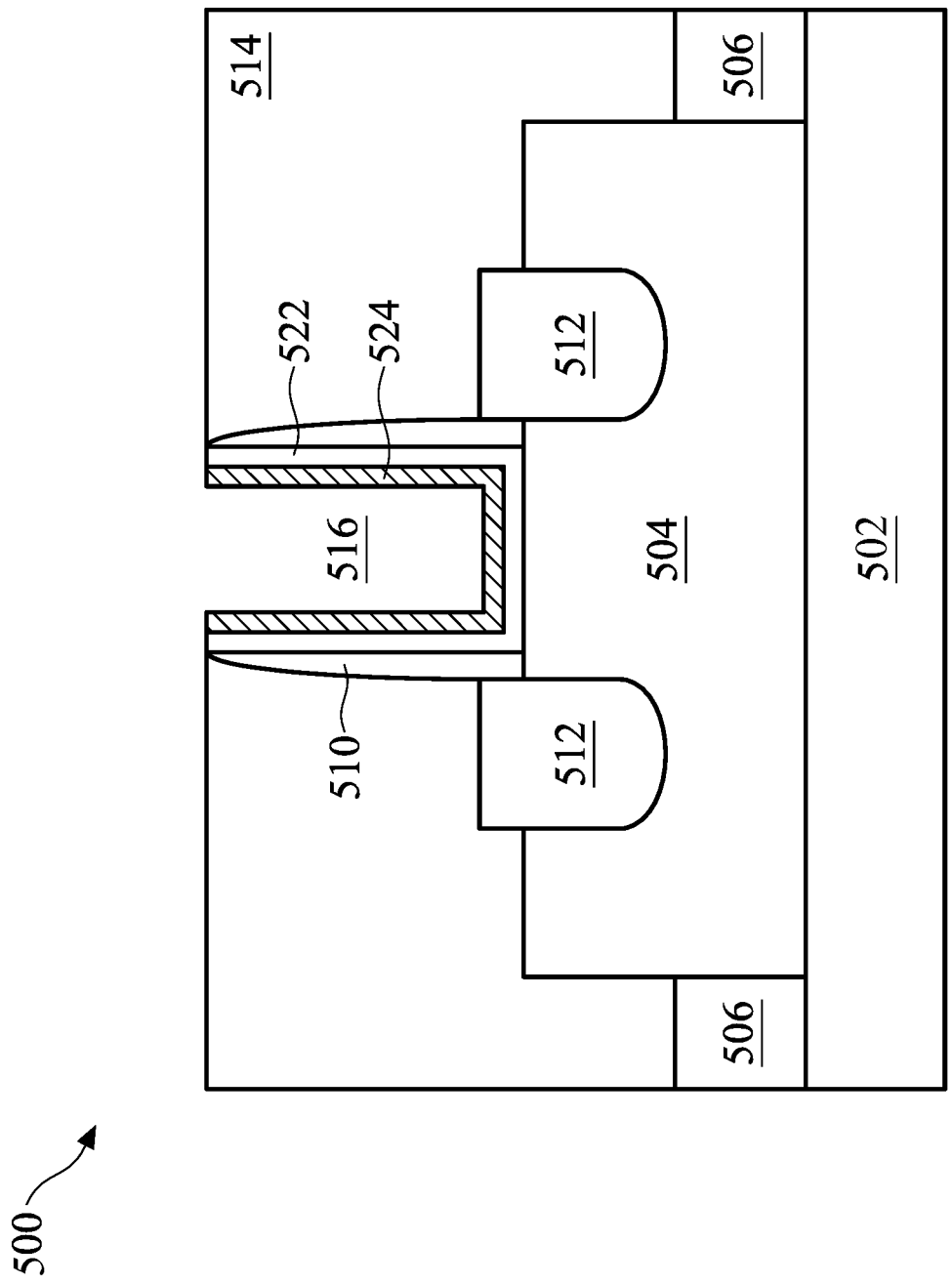
Figure 9E:
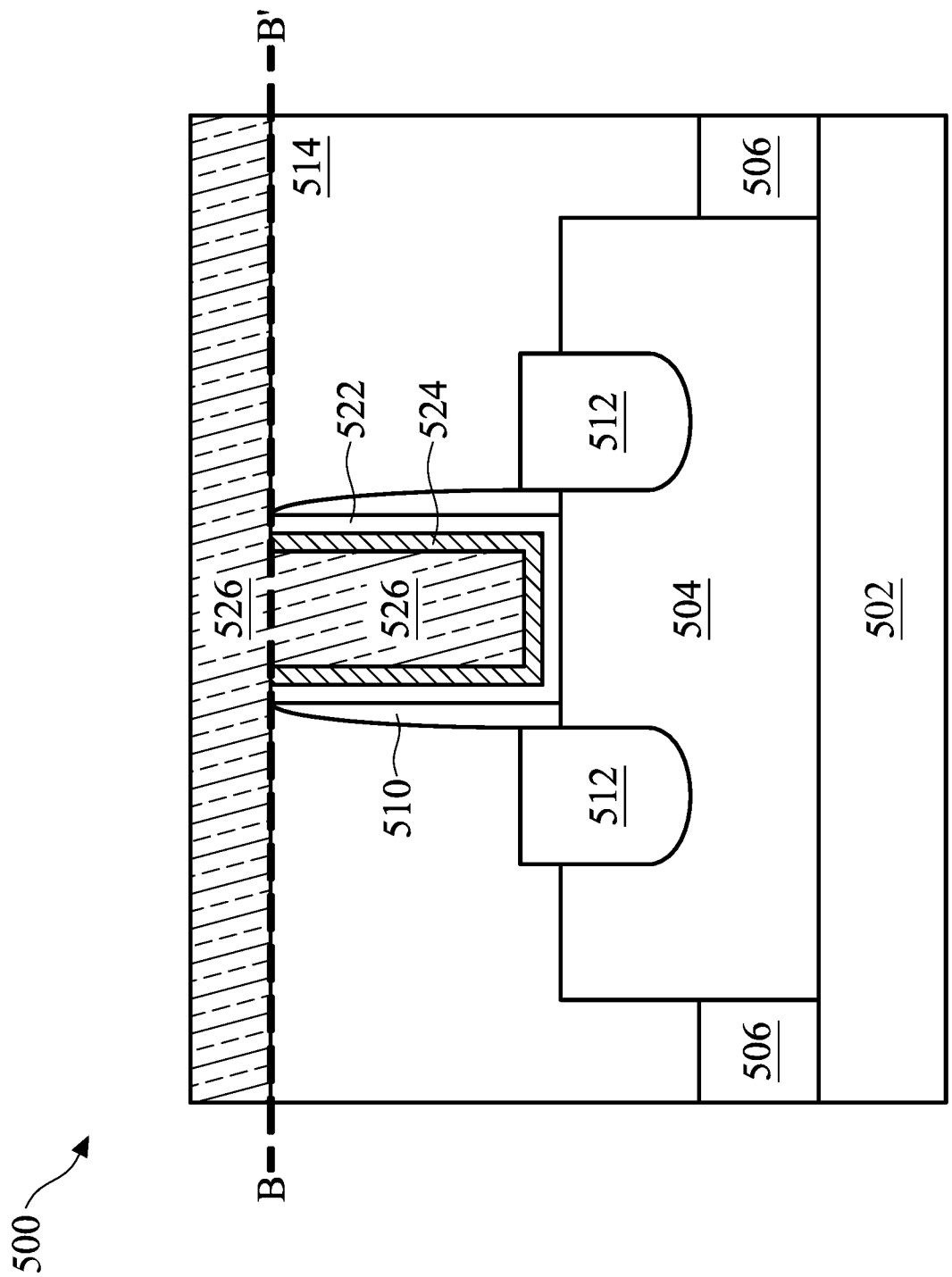

Referring to FIG. 9D, the method 400 deposits a high-k (having a dielectric constant greater than that of silicon oxide, which is about 3.9) gate dielectric layer 522 over the fin 504 in the gate trench 516 and subsequently deposits at least one work function metal layer 524 over the high-k gate dielectric layer 522. The high-k dielectric gate layer 522 may include one or more high-k dielectric materials (or one or more layers of high-k dielectric materials), such as hafnium silicon oxide (HfSiO), hafnium oxide (HfO$_2$), alumina (Al$_2$O$_3$), zirconium oxide (ZrO$_2$), lanthanum oxide (La$_2$O$_3$), titanium oxide (TiO$_2$), yttrium oxide (Y$_2$O$_3$), strontium titanate (SrTiO$_3$), or a combination thereof. The work function metal layer 524 may include any suitable material, such as titanium nitride (TiN), tantalum nitride (TaN), ruthenium (Ru), molybdenum (Mo), tungsten (W), platinum (Pt), titanium (Ti), aluminum (Al), tantalum carbide (TaC), tantalum carbide nitride (TaCN), tantalum silicon nitride (TaSiN), titanium silicon nitride (TiSiN), other suitable materials, or combinations thereof. In some embodiments, the work function metal layer 524 includes multiple material layers of the same or different types (i.e., both n-type work function metal or both p-type work function metal) in order to achieve a desired threshold voltage. Now referring to FIG. 9E, the method 400 deposits a bulk conductive layer 526 over the work function metal layer 524. The bulk conductive layer 526 may include aluminum (Al), copper (Cu), tungsten (W), cobalt (Co), ruthenium (Ru), other suitable conductive materials, or combinations thereof.

Figure 9F:
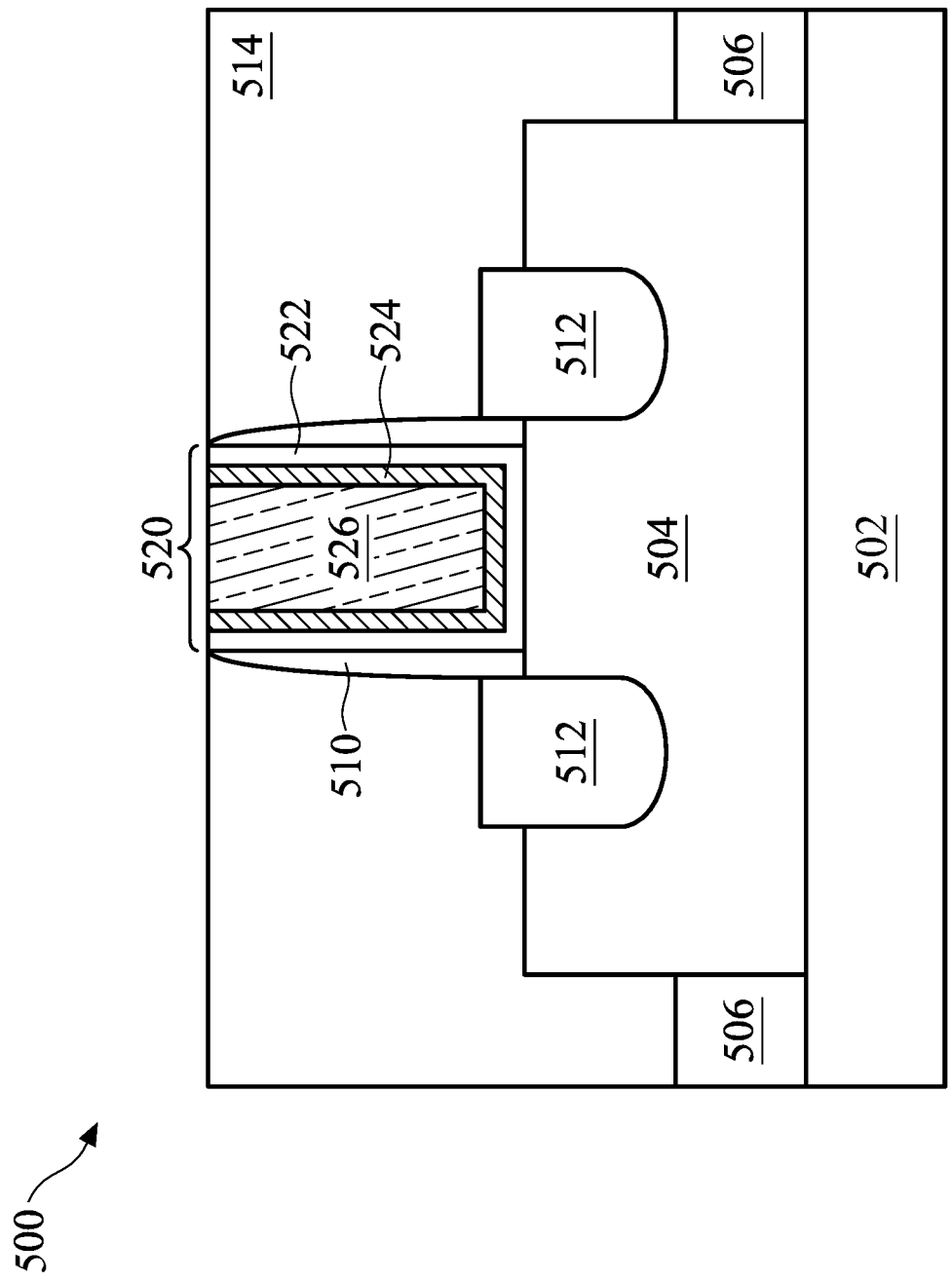

Now referring to FIGS. 8 and 9F, the method 400 at block 410 removes excess conductive material of the bulk conductive layer 526 formed over portions of the HKMG 520 and the ILD layer 514 in a CMP process substantially similar to the method 10 discussed above with respect to FIG. 7, which is implemented using a polishing pad that includes an embodiment of the CMP top pad 300. Specifically, referring back to FIG. 9E, the method 400 implements the CMP process along a line BB', which defines a top surface of the HKMG 520, and planarizes a top surface of the device 500 as a result.

Referring back to FIG. 8, the method 400 at block 412 may implement additional process steps to the device 500. For example, subsequent processing may form various contacts/vias/lines and multilayers interconnect features (e.g., metal layers and interlayer dielectrics) on the substrate, configured to connect the various features to form a functional circuit that may include one or more FinFET devices. In furtherance of the example, a multilayer interconnection may include vertical interconnects, such as vias or contacts, and horizontal interconnects, such as metal lines. The various interconnection features may employ various conductive materials including copper, tungsten, and/or silicide. In one example, a damascene and/or dual damascene process is used to form a copper related multilayer interconnection structure.

With respect to the description provided herein, the present disclosure offers a CMP polishing pad, as well as methods of making and using the same. According to some embodiments of the present disclosure, a CMP polishing pad provided herein includes a top pad having a network of pores embedded in a polymer matrix. In some embodiments, the top pad is fabricated by forming a self-assembled polymer network of two distinct phases from block co-polymers containing two dissimilar segments and subsequently removing one of the phases from the polymer network, resulting in pores extending throughout the remaining phase. In some embodiments, the removal of one of the phases includes implementing UV exposure, ozone treatment, and/or a hydrolysis treatment.

Although not intended to be limiting, one or more embodiments of the present disclosure provide many benefits to a semiconductor device and the formation thereof. For example, embodiments of the CMP polishing pad provided herein are configured with uniformly sized asperities and pores capable of accommodating and transporting abrasive particles in a CMP slurry across a substrate surface that needs to be polished, thereby eliminating the use of a pad conditioner during a CMP process. In addition, embodiments of the CMP polishing pad of the present disclosure provide pores having sizes on the nanoscopic scale, allowing the accommodation of smaller abrasive particles and reducing occurrences of inadvertent scratching, dishing, and/or erosion of a substrate surface during the CMP process.

In one aspect, the present disclosure provides a method of forming a CMP pad that that begins with providing a solution of a block copolymer (BCP), where the BCP includes a first segment and a second segment connected to the first segment, the second segment being different from the first segment in composition. The method proceeds to processing the BCP to form a polymer network having a first phase and a second phase embedded in the first phase, where the first phase includes the first segment and the second phase includes the second segment, and subsequently to removing the second phase from the polymer network, thereby forming a polymer film that includes a network of pores embedded in the first phase. Thereafter, the method proceeds to combining the CMP top pad and a CMP sub-pad to form a CMP pad, where the CMP top pad is configured to engage with a workpiece during a CMP process.

In another aspect, the present disclosure provides a method that includes forming a polishing pad configured for a CMP process, rotating the polishing pad about an axis, providing a CMP slurry to the polishing pad, where the CMP slurry includes a plurality of abrasive particles, and subsequently polishing a workpiece using the polishing pad and the CMP slurry, where the porous top pad facilitates motion of the plurality of abrasive particles across the workpiece. Specifically, the forming of the polishing pad begins with providing a polymer solution that includes a block copolymer (BCP), where the BCP includes a first segment and a second segment connected to the first segment, and proceeds to treating the polymer solution such that the BCP self-assembles into an interpenetrating polymer network having a first phase embedded in a second phase, where the first phase includes the first segment and the second phase includes the second segment. Thereafter, the forming of the polishing pad proceeds to removing the first phase from the interpenetrating polymer network, thereby forming a porous top pad, followed by adhering the porous top pad to a sub pad to form the polishing pad.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming a chemical-mechanical polishing (CMP) pad, comprising:
   forming a CMP top pad; and
   combining the CMP top pad and a CMP sub-pad to form the CMP pad,
   wherein the CMP top pad is configured to engage with a workpiece during a CMP process, and forming the CMP top pad comprises:
   providing a solution of a block copolymer (BCP) on a support substrate, wherein the BCP includes a first segment and a second segment connected to the first segment, the second segment being different from the first segment in composition;
   processing the BCP solution to form a polymer network having a first phase and a second phase embedded in the first phase, wherein the first phase includes the first segment and the second phase includes the second segment;
   removing the second phase from the polymer network, thereby forming a polymer film that includes a network of pores embedded in the first phase; and
   removing the polymer film from the support substrate.

2. The method of claim 1, wherein the first segment includes polycarbonate, polyamide, polysulfone, polyurethane, or combinations thereof.

3. The method of claim 1, wherein the second segment includes polylactic acid, polymethylmethacrylate, polybutylene, polyisoprene, or combinations thereof.

4. The method of claim 1, wherein processing the BCP solution includes applying an annealing treatment to the BCP solution or controlling an evaporation rate of the BCP solution.

5. The method of claim 4, wherein the annealing treatment is applied at a temperature higher than a glass transition temperature of the BCP.

6. The method of claim 1, wherein removing the second phase includes treating the polymer network with ultraviolet radiation, ozone, or a hydrolysis process.

7. The method of claim 6, wherein treating the polymer network with ultraviolet radiation includes applying ultraviolet radiation at a wavelength of about 254 nm or of about 365 nm.

8. The method of claim 6, wherein treating the polymer network with ozone includes applying ozone in air or in water.

9. The method of claim 6, wherein treating the polymer network with the hydrolysis process includes reacting the polymer network with an alkaline-based solution that includes potassium hydroxide, sodium hydroxide, ammonium hydroxide, or combinations thereof.

10. The method of claim 1,
wherein forming the CMP top pad further comprises removing a topmost portion and a bottommost portion of the polymer film; and
combining the CMP top pad and the CMP sup-pad comprises bonding the CMP top pad to the CMP sub-pad with an adhesive.

11. A method of forming a polishing pad, comprising:
forming a porous top pad; and
adhering the porous top pad to a sub-pad,
wherein forming the porous top pad comprises:
providing a solution of a block copolymer (BCP) on a support substrate, wherein the BCP includes a first segment and a second segment connected to the first segment, the second segment being different from the first segment in composition;
treating the BCP solution such that the BCP assembles into an interpenetrating polymer network having a first phase and a second phase embedded in the first phase, wherein the first phase includes the first segment and the second phase includes the second segment, and wherein the interpenetrating polymer network has a substantially periodic pattern;
removing the second phase from the interpenetrating polymer network, thereby forming a polymer film that includes a network of pores embedded in the first phase; and
removing the polymer film from the support substrate.

12. The method of claim 11, wherein the BCP solution includes the BCP dissolved in chloroform, dimethyl sulfoxide, chlorobenzene, or combinations thereof.

13. The method of claim 11, wherein treating the BCP solution includes thermally annealing the BCP solution to a temperature above a glass transition temperature of the BCP.

14. The method of claim 11, wherein the interpenetrating polymer network has a three-dimensional gyroid structure.

15. The method of claim 11, wherein removing the second phase includes treating the interpenetrating polymer network with ultraviolet radiation, ozone, or a hydrolysis process.

16. The method of claim 11, wherein forming the porous top pad further comprises removing a topmost portion and a bottommost portion of the polymer film.

17. The method of claim 11, wherein a ratio of a diameter of pores of the porous top pad to an overall thickness of the porous top pad is about $8\times10^{-8}$ to about $4\times10^{-5}$.

18. A method of forming a polishing pad, comprising:
forming a porous top pad; and
adhering the porous top pad to a sub-pad,
wherein forming the porous top pad comprises:
providing a solution of a block copolymer (BCP) on a support substrate, wherein the BCP includes a first segment and a second segment connected to the first segment, the second segment being different from the first segment in composition;
treating the BCP solution by supplying a thermodynamic driving force for ample time to
reach thermodynamic equilibrium, to form a polymer matrix having a first continuous phase and a second continuous phase embedded in the first continuous phase, wherein the first continuous phase includes the first segment and the second continuous phase includes the second segment;
removing the second continuous phase from the polymer matrix, thereby forming a polymer film that includes a network or pores embedded in the first continuous phase porous top pad; and
removing the polymer film from the support substrate.

19. The method of claim 18, wherein a volume fraction of pores of the porous top pad is about 5% to about 50%.

20. The method of claim 18, wherein treating the BCP solution includes applying an annealing treatment to the BCP solution or controlling an evaporation rate of the BCP solution.

* * * * *